United States Patent [19]
Reid et al.

[11] Patent Number: 5,854,805
[45] Date of Patent: Dec. 29, 1998

[54] LASER MACHINING OF A WORKPIECE

[75] Inventors: John Reid, Stittsville; David R. Walker, Ottawa, both of Canada

[73] Assignee: Lumonics Inc., Kanata, Canada

[21] Appl. No.: 821,545

[22] Filed: Mar. 21, 1997

[51] Int. Cl.[6] ................................................ H01S 3/0933
[52] U.S. Cl. ................................ 372/70; 372/10; 372/25; 372/75
[58] Field of Search ................................ 372/10, 25, 30, 372/33, 38, 69, 70, 71, 75

[56] References Cited

U.S. PATENT DOCUMENTS

| | | | |
|---|---|---|---|
| 5,151,909 | 9/1992 | Davenport et al. | 372/22 |
| 5,291,505 | 3/1994 | Nielson | 372/38 |
| 5,406,577 | 4/1995 | Gagosz | 372/69 |
| 5,450,125 | 9/1995 | Ulich et al. | 348/31 |
| 5,692,004 | 11/1997 | Greene | 372/69 |

OTHER PUBLICATIONS

Marshall, Gerald F., "Laser Beam Scanning Opto–Mechanical Devices, Systems, and Data Storage Optics", Marcel Dekker, Inc., New York, U.S.A., 1985, [No Month].
Koechner, Walter, "Solid–State Laser Engineering", Third Completely Revised and Updated Edition, Springer–Verlag, pp. 381–393, [No Date].
8.4 Acoustooptic Q–Switches, pp. 466–467, [No Journal Name or Date].
Section 3.6.5 *Laser–Diode–Pumped Systems*, pp. 127–136, [No Journal Name or Date].
Section 3.6.3 *Nd:YAG*, pp. 120–122, [No Journal Name or Date].
Greiner, U.J. et al., "Thermal lens correction of a diode–pumped ND:YAG laser of high $TEM_{00}$ power by an adjustable–curvature mirror", Optics Letters, Optical Society of America, vol. 19, No. 16, Aug. 15, 1994, pp. 1207–1209.
Tidwell, S.C. et al., "Highly efficient 60–W $TEM_{00}$ cw diode–end–pumped Nd:YAG laser", Optics Letters, Optical Society of America, vol. 18, No. 2, Jan. 15, 1993, pp. 116–118.
Murdough, Matthew P. et al., "Mode–volume and pump–power limitations in injection–locked $TEM_{00}$ Nd:YAG rod laser", Applied Optics, vol. 35, No. 30, 20 Oct. 1996, pp. 5925–5936.
Tidwell, Steve C. et al., "Scaling CW Diode–End–Pumped Nd:YAG Lasers to High Average Powers", IEEE Journal of Quantum Electronics, vol. 28, No. 4, Apr. 1992, pp. 997–1009.

*Primary Examiner*—John D. Lee

[57] ABSTRACT

A laser machining (including marking) method that employs a diode laser pumped solid state laser is controlled by a computer that contains a program for the interaction of the laser beam with a workpiece. The pumping of the laser is synchronised with the action of the beam in a series of active machining periods alternating with inactive non-machining periods. In order to avoid overheating of the active element, the duty cycle of these periods is maintained below a chosen value and no active period is allowed to exceed a selected percentage of the thermal time constant of the active element.

7 Claims, 3 Drawing Sheets

LASER MACHINING OF A WORKPIECE

FIELD OF THE INVENTION

The invention relates to laser machining, that is to say a system in which the energy of a laser beam is used to make grooves, holes or vias in, or otherwise etch or ablate, a workpiece, including forming marks, letters, numbers or other patterns on the surface of the workpiece, and welding or cutting the workpiece.

BACKGROUND OF THE INVENTION

Laser machining can be performed by various different types of laser. One type that has been employed for this purpose is a solid state laser, e.g. a doped crystal active element, such as Nd:YAG, that is pumped by an appropriate light source, such as one or more lamps or an array of diode lasers. The term "active element" is used throughout this application as the generic term for a "rod" or "slab". The diode pumping method is often preferred, because it has higher electrical efficiency, and a diode array can be more rapidly switched on and off than lamps. The present invention is concerned only with the diode pumped type of solid state laser, but includes both side pumped and end pumped forms. While a plurality of laser diodes is normally necessary, there may be situations in which a single laser diode is sufficient. For this reason, the term laser diode array as used herein includes a single diode.

A problem with a typical diode pumped solid state laser arises from thermal issues in the laser active element. After pumping energy has been applied by the diode array for only about 200 msec., for example, (a typical thermal time constant, a concept that will be more fully explained below), enough heat may have accumulated in the laser active element to raise its temperature to such an extent that its performance becomes unsatisfactory, e.g. altered in beam quality and/or limited in power. Typically, the output power of the laser reaches a peak value at a certain temperature of the active element and it is found that this value cannot be increased by applying more energy from the diode array. Indeed, the application of more input energy from the diode array often tends to cause a fall off in the output power or further beam distortion. These problems are often referred to in the art as thermal distortion, stress-induced birefringence or thermal lensing, or a combination thereof. A number of efforts have been made to overcome or correct for these problems. See, for example, U. J. Greiner et al. "Thermal lens correction of a diode pumped Nd:YAG laser of high $TEM_{00}$ power by an adjustable-curvature mirror", published in Optics Letters Aug. 15, 1994, Vol. 19, No. 16, pp 1207–1209. In a more recent article published in Applied Optics, 20 Oct. 1996, Vol. 35, No. 30, entitled "Mode-volume and pump-power limitations in injection-locked $TEM_{00}$ Nd:YAG active element lasers", M. P. Murdough et al. show experimentally and theoretically that the active element temperature problem forces a limitation on the average output power that can be obtained from this type of laser.

However, if the laser is operated for only a much shorter period than its thermal time constant, e.g. for 20 msec., the temperature of the active element does not have time to reach a level that causes these problems. In this case the input power from the diode array can be boosted enough to generate a burst of increased output power from the active element that is greater than its average output power.

There are many commercial machining processes to which these lasers are suited. One such process is the surface marking of a workpiece, e.g. the formation of lettering, numbering or other symbols on the workpiece by ablation or by the changing of the colour or nature of the surface in such a manner as to render the marking visible.

In one such surface marking system, each mark, e.g. letter, is formed from a series of dots on the workpiece surface, this series of dots tracing out the shape of the letter. Each dot is formed by a short, high power pulse (or group of pulses) from the laser. A conventional galvanometer device that can scan in two mutually perpendicular directions is used to move the impact location of the laser beam on the workpiece to produce the scan required to trace out such mark, i.e. to move the beam among a plurality of impact locations in accordance with a predetermined program designed to produce the desired pattern. This process necessarily involves some inactive periods of the laser beam. For example, when tracing out a letter with a sudden change of direction, e.g. the capital letter L, the galvanometer device, after moving the laser beam downwardly at high speed to trace out the vertical bar of the letter, has too much inertia to stop suddenly. As a result, the laser beam must be temporarily prevented from continuing the marking downwardly beyond the desired point at the lower end of the vertical bar while the galvanometer device is decelerated. Similarly, in order to be brought up to speed to scan to the right to form the horizontal bar of this letter, the galvanometer device requires some acceleration time before the laser beam is again allowed to be active. While the amount of these inactive periods varies from letter to letter, it typically ranges from 30% and 70% of the total time. In other words, the laser beam is only used to mark the workpiece for about half the total scanning time. This result is conventionally achieved either by a Q-switch that inhibits lasing or by a shutter external to the laser cavity, that occludes the beam.

Another commercial process for which a solid state laser may be used is the drilling of holes in or through a workpiece or otherwise cutting, welding or working the workpiece. In these cases it may be necessary for each hole or cut to be formed by a sequence of laser pulses all directed to the same spot on the workpiece. To avoid excessive heating, there may be need for some inactive periods between pulses or groups of pulses. Also, if a series of holes or cuts is being formed, there will be a need to halt the laser beam operation momentarily while the system realigns the workpiece relative to the beam. In both these circumstances, the system requires inactive periods during which the laser beam is not being used at all.

SUMMARY OF THE INVENTION

The present invention takes advantage of these inactive periods by switching the diode array in such a manner as to modulate the input pumping power from the diode array in accordance with the thermal time constant and the average thermal loading of the laser active element, together with the demands of the commercial process that the laser output is being used to carry out, i.e. the necessary sequence of active and inactive periods.

More specifically the invention provides a method of machining a workpiece with laser energy, comprising generating a laser beam by pumping an active element of a solid state laser with a laser diode array, the active element having thermal characteristics including a thermal time constant that limits the output energy of the laser, and directing the beam to a first impact location on a workpiece. The beam is moved among a plurality of further such impact locations to machine the workpiece in accordance with a predetermined program in which the beam has active machining periods alternating with inactive non-machining periods in a duty cycle that is defined by the total lengths of the active periods of the beam as a percentage of the total combined lengths of the active and inactive periods of the beam. The diode array is switched on and off in accordance with the program so as to render the laser inactive during the inactive periods of the beam and active during its active periods. The lengths of some of these periods, particularly the inactive periods in the program, are adjustable to maintain the duty cycle at no more than approximately 75%, preferably below about 60% and above about 20%. At the same time, each individual length of the active periods in the program is controlled to be no longer than approximately 50% of the thermal time constant. Preferably this length will be significantly less than 50% and still more preferably no longer than about 20%.

In this way, overheating of the active element and the problems mentioned above can be avoided, and the laser output power available for active machining is greater than it otherwise would have been.

The invention also relates to apparatus for carrying out this method and achieving these advantages.

More specifically the apparatus comprises a solid state laser having an active element and a laser diode array for pumping the active element, the active element having thermal characteristics including a thermal time constant that limits the output of the laser. Means are provided for directing a beam generated by the laser to a first impact location on a workpiece and for moving the beam relative to the workpiece among a plurality of further such impact locations to machine the workpiece. The movement of the beam may be carried out by a galvanometer device or by an alternative device that achieves the same effect. See the book "Laser Beam Scanning" edited by Gerald F. Marshall and published by Marcel Dekker Inc., 1985. Also, since the movement between the beam and the workpiece is a relative one, the beam can be fixed and the table supporting the workpiece can be moved.

A computer controls the beam directing and moving means in order to machine the workpiece in accordance with a predetermined program. In this program the beam has active machining periods alternating with inactive non-machining periods in the duty cycle defied above. The computer also controls the diode array to switch it on and off in accordance with the program so as to render the laser inactive during the inactive periods of the beam and active during its active periods. In addition, the computer ensures that the lengths of the active and/or inactive periods in the program are such as to maintain the duty cycle below the chosen value, and that the individual lengths of the active periods in the program are such as to maintain each such individual length no longer than the selected maximum percentage of the thermal time constant.

References herein to switching the diode array "off" refer to switching such array to a level close to or below its threshold for optical emission, so that pumping is "off", but does not exclude energizing the diode array at a low level for purposes of temperature control of the diodes themselves.

DETAILED DESCRIPTION OF THE EMBODIMENTS

Figure 1:
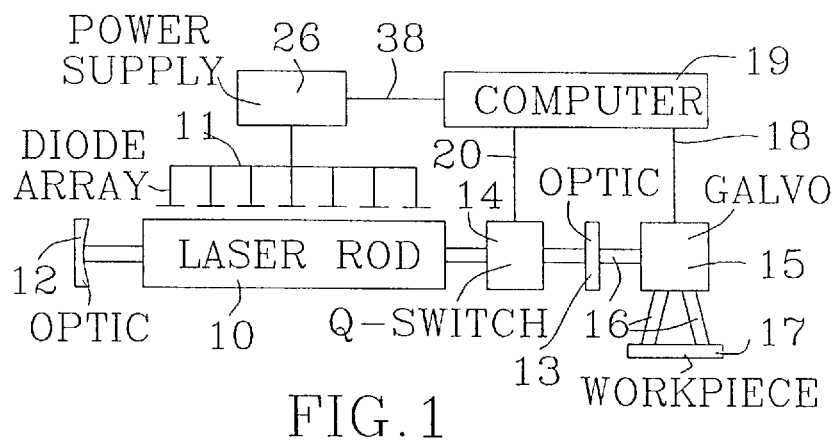
FIG. 1 is a schematic illustration of a diode laser pumped solid state laser system according to an embodiment of the invention.

FIG. 1 shows a typical solid state laser comprising a doped laser active element 10 that is pumped by an array 11 of laser diodes shown diagrammatically. The system includes conventional optics 12, 13, a conventional Q-switch 14, and a conventional galvanometer device 15 having mirrors (not shown) for directing pulses of the laser output beam 16 onto a workpiece 17. Through a connection 18, a computer 19 controls the galvanometer device 15 to redirect the beam 16 to each desired impact location on the workpiece 17, e.g. to trace out the letter or other symbol to be written, as explained above. This arrangement and this procedure are well known and widely practised. The computer software incorporates a program defining the particular pattern of the scan, as well as the length of time required to form each selected symbol or part thereof, including the inactive periods required between the two or more active scans that are needed to form most symbols.

Figure 2:
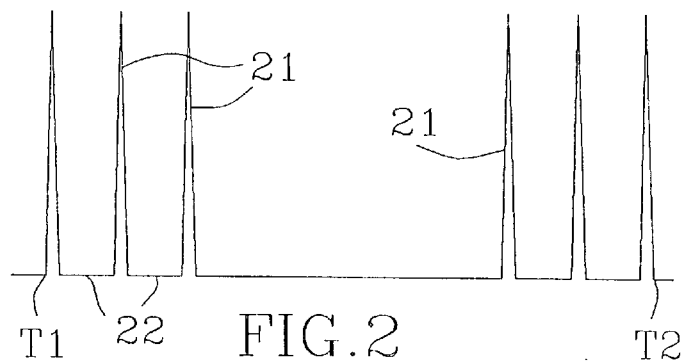
FIG. 2 is an enlarged diagram showing details of laser pulses.

In addition, through a connection 20, the computer 19 controls the Q-switch 14 to convert the beam into a series of high power, short pulses 21 (FIG. 2) each of about one microsecond or less in length and separated by longer recovery periods 22. During this recovery time, energy is stored in the laser for release as a pulse when the Q-switch is next opened. One of these pulses then forms each dot that is required to form the symbol. This operation is also well-known and widely practised.

As explained above, in some commercial processes, e.g. the fine cutting of thin metal sheets, the laser output is not converted into a series of separate pulses. In this case, the Q-switch 14 is dispensed with and the output of the laser is directed unmodified onto the workpiece.

It will be convenient at this point to provide illustration of the problem of temperature limitation of the laser output that has been discussed above.

Figure 3:
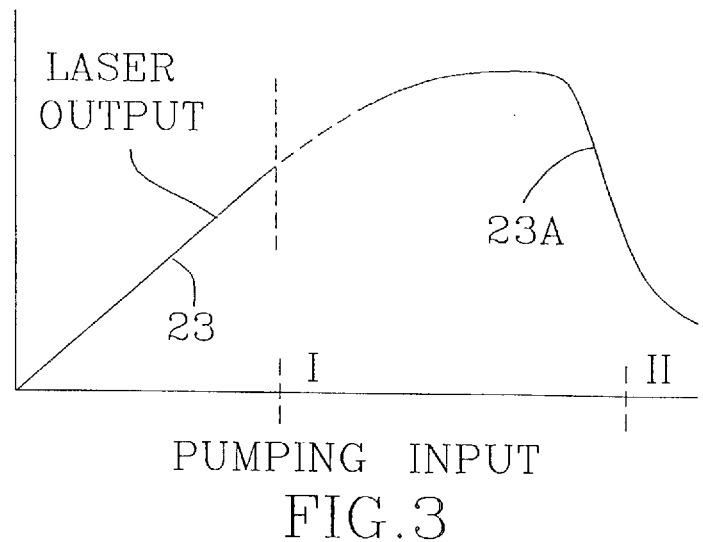
FIG. 3 is a diagram showing typical performance of a solid state laser, with the laser output plotted against the pumping input.

FIG. 3 shows the effect on the laser output power 23 of the level of continuous pumping input from the diode array. Up to a level that has been designated I the laser output increases substantially linearly and the output beam is satisfactory. If the input level is doubled to the value II there is major degradation of the beam as indicated by the curve 23A.

Figure 4:
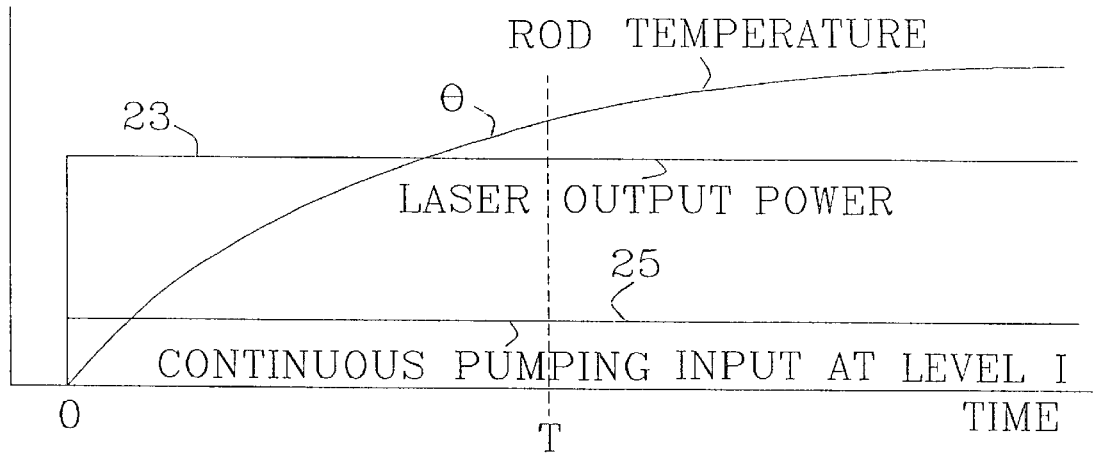
FIG. 4 is another diagram showing the laser output and active element temperature plotted against time for conventional pumping input.

FIG. 4 shows the output power 23 when continuous pumping input at level I by diode current 25 is initiated at time 0, the active element temperature θ rising with time. The thermal time constant is defined by $$\theta(t) = \theta_{max}(1 - e^{-t/\tau})$$

where θ(t) is the active element temperature at a given time t, $\theta_{max}$ is the maximum value that the active element temperature reaches, and T is the thermal time constant.

Figure 5:
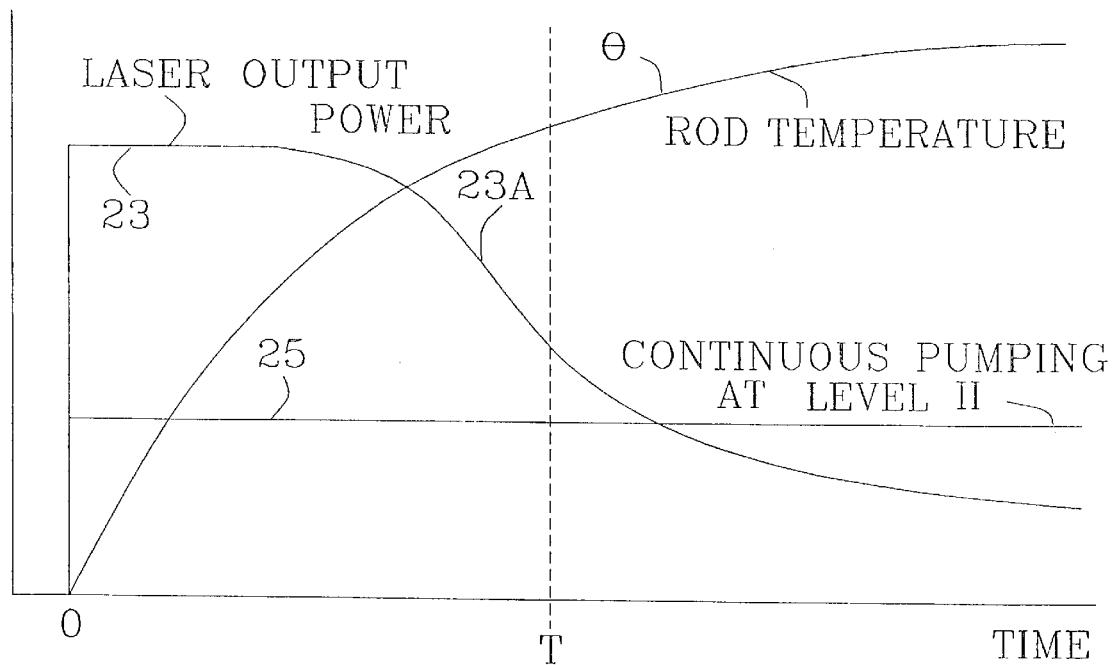
FIG. 5 is a further diagram showing the same parameters as in FIG. 4 but for a double pumping input.

FIG. 5 shows the same parameters when the continuous pumping is increased to level II. The thermal time constant T is always the same (for a given laser construction), but the output power 23 has deteriorated to 23A well before time T is reached.

Figure 6:
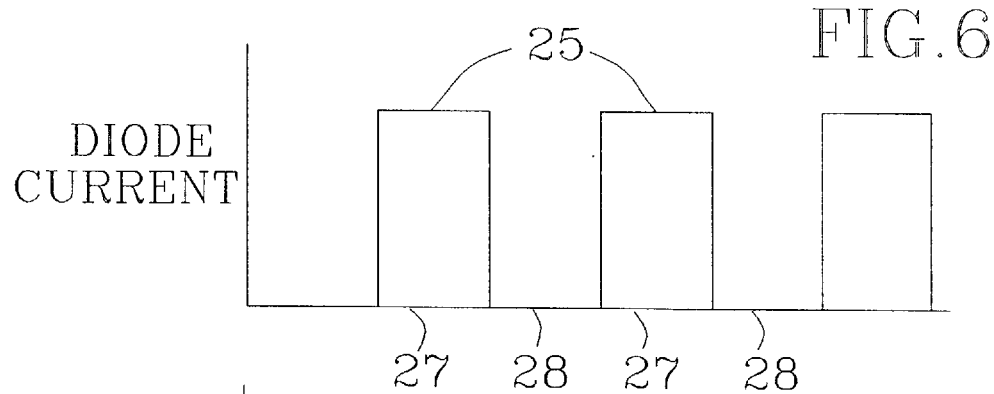
FIG. 6 is a diagram showing a possible distribution of diode current for such a laser with respect to time.
Figure 7:
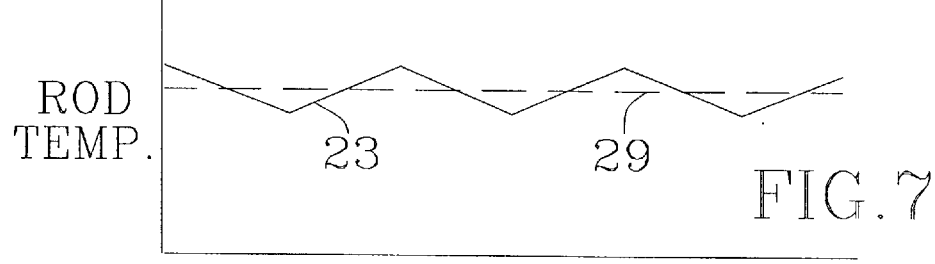
FIG. 7 is a diagram showing the laser active element temperature achieved with the distribution of FIG. 6.

FIG. 6 shows a technique for switching on and off the diode current 25 that the array 11 receives from a power supply 26. In this diagram the on or active periods 27 are shown as being the same length as the off or inactive periods 28, i.e. there is a duty cycle of 50%. FIG. 7 shows the effect of this method of operation on the active element temperature 23. If the periods 27 are short compared with the time T. the temperature 23 quickly reaches a near equilibrium value 29 that is approximately the chosen duty cycle percentage, e.g. 50%, of the temperature that the active element would have reached during continuous operation of the laser. As a result, the laser becomes able to provide bursts 30 of output power, each of which has an average value 31 that is approximately twice the average output power that can be obtained in continuous operation.

In an example, the periods 27 might be about 10% (20 msec.) of a typical thermal time constant T (200 msec.), although this ratio can be modified to fit circumstances. If this ratio is increased, the curve 23 has sharper peaks and valleys, which somewhat lessens the performance of the laser in terms of achievable output power. If the ratio is decreased, the curve 23 becomes flatter. The value of 10% has been illustrated largely because this is readily acceptable for most commercial processes. However, with some processes that require relatively long bursts of laser energy, this ratio can be increased. The upper limit is arbitrary, because in a given situation it will be determined by the degree to which a reduction of some of the advantages of the present invention can be tolerated. An arbitrary upper limit has been chosen at 50%. In the majority of instances, however, there will be no difficulty in keeping the ratio no higher than 20%.

The duty cycle, i.e. the relationship between the active periods 27 and the inactive periods 28, or more accurately, the total lengths of the active periods as a percentage of the total lengths of the active and inactive periods combined, can also vary from the 50% example given above. However, as this duty cycle is increased, the average temperature value 29 in FIG. 7 moves up to a greater proportion of the continuously operating temperature value, so that the temperature of the active element approaches a value at which the output power level 31 moves down and is no longer equal to twice the continuous output power. On the other hand, if the duty cycle is reduced below 50%, so that the system provides excellent output characteristics, the increased length of the inactive periods 28 tends to slow down the processing of the workpiece, which may be commercially unacceptable, or at least undesirable. However, since the range of commercial machining processes to which the system is applicable is very wide, the only limit on the minimum value of the duty cycle is the practical one of acceptability by the particular commercial process being carried out. For these reasons, although the preferred value of the duty cycle for most applications will be from about 40% to about 60%, when maximum additional power is not of primary concern, this value can be increased, say to an arbitrary limit of 75%, or, when speed of processing can be sacrificed to other considerations, it can be reduced below 40%.

Figure 9:
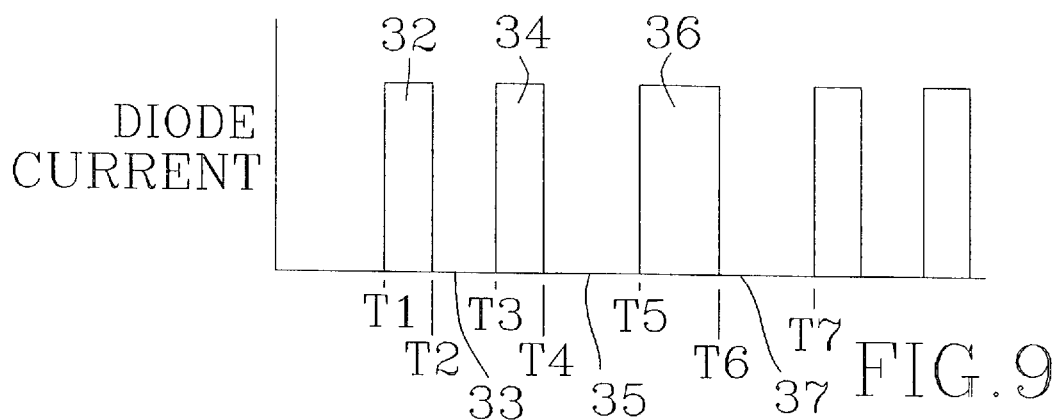
FIG. 9 is a diagram showing another distribution of diode current.

While FIG. 6 shows a uniform distribution of active and inactive periods, each of equal length and equally spaced from each other, the diagram of FIG. 9 shows a typical, less regular, distribution that is appropriate to operating a machining process that involves inscribing letters or other symbols on the workpiece. Again taking the writing of the letter L as the example, an output burst 32 will require to be on for the period between times T1 and T2 to make the vertical bar of this letter. Although not shown in FIG. 7, in reality the output burst 32 represents the envelope of the series of pulses 21 shown in FIG. 2. Then, between times T2 and T3 there is an inactive period 33 required by the inertia of the galvanometer device 15. This is followed by a further active period 34 between times T3 and T4 while the horizontal bar of the letter is inscribed. These periods 32 to 34, which vary with the letter or other symbol being written, are each typically a few msec. in length. Then there is a period 35 between times T4 and T5 while the galvanometer device is moved to direct the laser pulses to another starting impact location on the workpiece in preparation for writing the next symbol. The next symbol could be the letter O, for example, which letter can be written by a single, uninterrupted, simultaneous scan of the two mirrors in the galvanometer device. This scan is rather longer than before and is assumed to occupy the period 36 from time T5 to time T6. Another inactive period 37 between times T6 and T7 follows, and the process continues in a like manner in accordance with the particular pattern of symbols that the computer has been programmed to write.

The total length of this sequence of active periods 32, 34 and 36, etc., as a percentage of the total length of the active periods and the inactive periods 33, 35, 37, etc. constitutes the duty cycle of the operation. Since the computer program includes data on the individual lengths of those active and inactive periods, as needed to operate the galvanometer device 15, this same data is used through a connection 38 to switch on and off the power supply 26 of the diode array, and hence control these diodes. By these two simultaneous controls of the galvanometer device and the diode array, the laser is operated only when its output is needed to mark the workpiece. In addition, the duty cycle is controlled. If the computer calculates that the active and inactive periods required by the text being written would result in a duty cycle higher than the chosen value, say 50%, it will adjust these periods, e.g. increase the length of the inactive periods as necessary to bring the duty cycle down to such chosen value. In practical terms, in the example of FIG. 9, this could mean increasing the periods 33, 35, 37, etc. to bring their total lengths into the required relationship with the total lengths of the periods 32, 34, 36, etc. Any adjustments by the computer of the active or inactive periods of the diode array to produce the desired duty cycle will be followed in its control of the galvanometer device 25 so as to ensure that the energisation of the laser is always coordinated with the movements of the galvanometer device.

The Q-switch pulse generating operation will remain essentially unchanged by any variations in the lengths of the active or inactive periods, since the number of short pulses needed to write the part of a symbol currently being written does not change. However, the timing of the beginning and ending of each Q-switch operation will be coordinated with that of the galvanometer device and the diode array through the connections 20 and 38.

Typical plastic materials that are marked with a Q-switched YAG laser are acrylonitrile butadiene styrene, polybutylene terephthalate, acetyl copolymers, polyamides (e.g. nylon 6,6) and thermoset epoxies.

Figure 8:
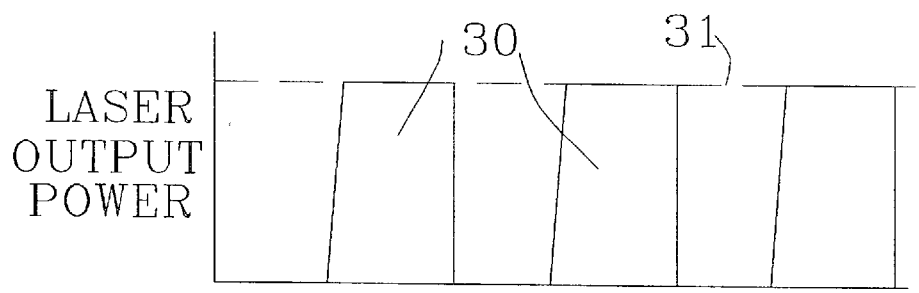
FIG. 8 is a diagram showing the laser output achieved with the distribution of FIG. 6.

In those cases where no Q-switch is employed, the same method of controlling the duty cycle of the operation of the diode array is employed. In this case the bursts of laser output will likely be longer than the typical few msec. of the active and inactive periods shown in FIG. 9. For example, bursts such as those shown at 30 in FIG. 8 may be used, although the lengths of the bursts will be varied to suit the processing requirements. There is a proviso, however, that no active period length be allowed by the computer to become excessive relative to the thermal time constant T of the laser active element, i.e. it must not exceed the upper limit chosen, e.g. 50%, of this thermal time constant. If the computer finds that a given active period would exceed this upper limit, it splits this active period into two or more parts each of a length within the allowed limit, and provides an inactive period or inactive periods between such parts. At the same time, the lengths of the respective active and inactive periods will be kept by the computer such as to produce the desired duty cycle.

Typical plastic materials that are marked by a YAG laser without a Q-switch are other thermoset epoxies and polyesters. Such a laser is also appropriate for welding metal or drilling holes or cutting grooves in metal. One important industrial application for a diode pumped laser with a duty cycle no greater than 50% and no Q-switch is the cutting of solder screens for printed circuit boards. The process works best with short pulses of high peak power, i.e. a relatively low duty cycle of around 30%.

It is known to switch a pumping diode array on and off for purposes other than that of the present invention. For example, in U.S. Pat. No. 5,291,505 issued Mar. 1, 1994 to K. E. Nielsen, a diode pumping array is switched for the purpose of maintaining the laser output energy at the desired level over different pulse repetition frequencies, time and environmental conditions.

In contrast, in the present invention the diode array is switched in synchronism with the beam movement from location to location on the workpiece, and provision is made for the active and inactive periods of the array to be monitored by the computer and, if necessary, modified to achieve the desired thermal conditions.

We claim:

1. A method of machining a workpiece with laser energy, comprising:

(a) generating a laser beam by pumping an active element of a solid state laser with a laser diode array, said active element having thermal characteristics including a thermal time constant limiting the output energy of the laser;

(b) directing said beam to a first impact location on a workpiece, and moving the beam relative to the workpiece among a plurality of further such impact locations to machine the workpiece in accordance with a predetermined program in which the beam has active machining periods alternating with inactive non-machining periods in a duty cycle that consists of the total lengths of the active periods of the beam as a percentage of the total combined lengths of the active and inactive periods of the beam;

(c) switching the diode array on and off in accordance with said program to render the laser inactive during said inactive periods of the beam and active during said active periods of the beam;

(d) ensuring that the lengths of the active and/or inactive periods in said program maintain said duty cycle at no more than approximately 75%; and (e) ensuring that the individual length of each of the active periods in said program is no longer than approximately 50% of said thermal time constant.

2. A method according to claim 1, including maintaining the duty cycle at no more than approximately 60%.

3. A method according to claim 1, including maintaining the duty cycle in a range of approximately 20% to approximately 60%.

4. A method according to claim 1, including maintaining each said individual length no longer than approximately 20% of said thermal time constant.

5. A method according to claim 1, including Q-switching the laser beam to convert it to a series of spaced apart short pulses each of greater power than the average power of the beam, and synchronising the operation of the Q-switching with said program.

6. Apparatus for machining a workpiece with laser energy, comprising:

(a) a solid state laser having an active element and a laser diode array for pumping the active element, the active element having thermal characteristics including a thermal time constant limiting the output of the laser;

(b) means for directing a beam generated by the laser to a first impact location on a workpiece and for moving the beam relative to the workpiece among a plurality of further such impact locations to machine the workpiece; and (c) a computer comprising:

(i) means for controlling said beam directing and moving means to machine the workpiece in accordance with a predetermined program in which the beam has active machining periods alternating with inactive non-machining periods in a duty cycle that consists of the total lengths of the active periods of the beam as a percentage of the total combined lengths of the active and inactive periods of the beam;

(ii) means connected to control the diode array to switch said array on and off in accordance with said program to render the laser inactive during said inactive periods of the beam and active during said active periods of the beam;

(iii) means for ensuring that the lengths of the active and/or inactive periods in said program maintain said duty cycle below a chosen value; and (iv) means for ensuring that the individual length of each of the active periods in said program is no longer than a selected percentage of said thermal time constant.

7. Apparatus according to claim 6, wherein the laser includes a Q-switch for converting the beam to a series of spaced apart short pulses of greater power than the average power of the beam, and the computer includes means for synchronising the operation of the Q-switch with said program.

* * * * *